W. H. LIVINGSTON.
Tree-Protector.
No. 30,584 Patented Nov. 6. 1860.
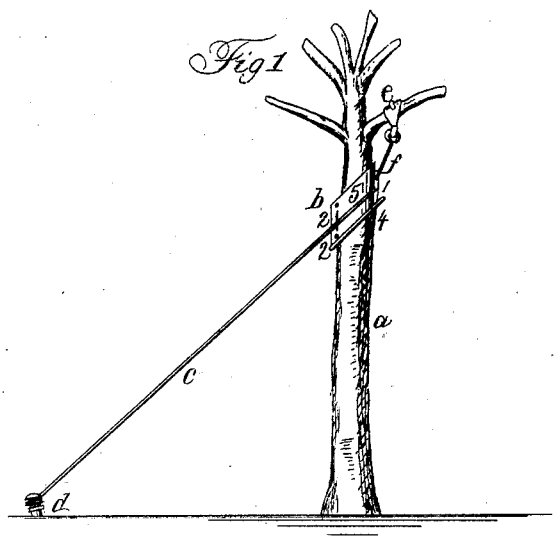
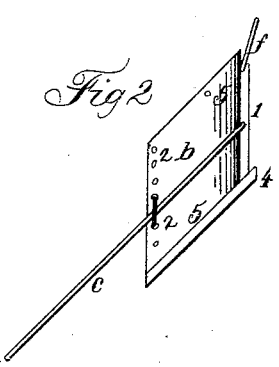
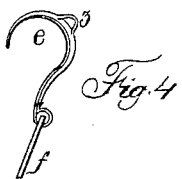
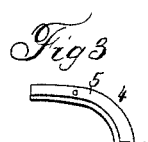
WITNESSES:
Lemuel W. Powell
Thos. Geo. Harold
INVENTOR:
Wm H. Livingston

UNITED STATES PATENT OFFICE.

WM. H. LIVINGSTON, OF NEW YORK, N. Y.

IMPROVED DEVICE FOR SUSTAINING TREES.

Specification forming part of Letters Patent No. 30,584, dated November 6, 1860.

*To all whom it may concern:*

Be it known that I, WILLIAM H. LIVINGSTON, of the city and State of New York, have invented, made, and applied to use certain new and useful Means for Sustaining or Training Trees; and I do hereby declare that the following is a full, clear, and exact description of the nature of my said invention, reference being had to the annexed drawing, making part of this specification, wherein—

Figure 1 is a side elevation representing my device as applied to a tree. Fig. 2 is a side view. Fig. 3 is a plan of my supporter, and Fig. 4 is a side view of my training-hook. The last three figures are in larger size than Fig. 1, and similar marks of reference denote the same parts.

In the cultivation of trees, especially fruit-trees, great difficulty arises in making the trunk grow vertically, and still greater difficulty is involved in straightening up a tree that has commenced to grow crooked. Various devices have been resorted to, such as braces and props. These, however, come in contact with the tree in a manner liable to injure both the bark and the tree itself; and various pads of leather and cloths have been used, all of which are either difficult of application or liable to injure the tree.

My said invention consists of a semicircular metallic supporter, into which the tree or limb lies, and which is sufficiently large to allow for the growth of the tree, and to which the wire or cord forming the brace is attached and connected to a stake or other means for fastening. My metallic supporter takes an extended surface on the tree without the possibility of the wire or brace cutting or injuring said tree, and the swaying motion of the tree by the wind does not tend to abrade or injure the bark, because the metallic supporter swings or sways with the tree and is not tightly confined around one place. I place my tree-supporter over a limb or branch or in one of the crotches against the main trunk or limb to be acted on; or I suspend said supporter, by a peculiar hook, over one of the limbs, from which a wire or cord passes to said supporter.

In the drawings, $a$ represents the trunk and some of the limbs of a tree. $b$ is my metallic semicircular tree-supporter. $c$ is a brace therefrom to the stake $d$ or other point for attachment. $e$ is my training-hook, with the wire $f$ to the supporter $b$ aforesaid. The supporter $b$ is formed with the rib 1 vertically on one side, which is perforated at the middle to pass the brace $c$, so that said supporter will bear equally against the tree regardless of the angle at which the brace goes off; and 2 2 are holes through which a piece of wire is inserted to confine the said brace at the point where it passes off. In the upper end of this rib 1 is a second hole to receive the wire $f$ to the hook $e$. This hook $e$ is formed with the loop 3, through which a spur or nail at the end of a pole may be inserted for carrying this hook up into a tree to any desired point, or for lifting the same off any branch when desired; or into this loop a second wire may be introduced, going to another hook on some other part of the tree, if it be desired to connect to other branches or limbs for training the same in any desired direction.

4 is a flange projecting around the edge of the supporter $b$, so that the edge will not cut the tree if the supporter is placed in a crotch, and at the same time the metal is strengthened. The top and bottom edges of this supporter stand diagonally, as seen in Fig. 2, so as to be better adapted to setting into a crotch, and also corresponding generally to the direction of the brace. If a pad is required inside this supporter, the same may be attached to the holes 5 5 by string or otherwise.

I have represented and described my supporter as nearly semi-cylindrical; but the same may be more or less of cylindrical segment, so long as the sides thereof keep the wire or brace from injuring the tree. Several of these supporters may be applied to one tree, although one will be generally sufficient, as the strong winds that injure trees generally come from one direction; and it will be seen that the wire through the holes 2 2 connect the supporter to the brace, so as to prevent movement in the supporter itself when the tree is released or acted on by the wind in the contrary direction; and the growth of the tree will not be affected because the tree will lie lightly against the supporter, or not even touch the same except when the wind blows. Thus the new wood will be free to form.

What I claim, and desire to secure by Letters Patent, is—

1. The segmental tree-supporter $b$, constructed and operating substantially as specified.

2. The hook $e$, formed with the loop 3, by which said hook and the wire or brace connected thereto may be lifted onto or off of a limb or branch, for the purposes and as set forth.

In witness whereof I have hereunto set my signature this 24th day of August, 1860.

WM. H. LIVINGSTON.

Witnesses:
 LEMUEL W. SERRELL,
 THOS. GEO. HAROLD.